F. S. HOLLEY.
TRAVELING HARVESTER.
APPLICATION FILED OCT. 23, 1912.

1,096,428.

Patented May 12, 1914.
3 SHEETS—SHEET 2.

WITNESSES:
F. E. Maynard
Charles Pickles

INVENTOR
Frank S. Holley,
BY G. H. Strong.
ATTORNEY

F. S. HOLLEY.
TRAVELING HARVESTER.
APPLICATION FILED OCT. 23, 1912.

1,096,428.

Patented May 12, 1914.

3 SHEETS—SHEET 3.

WITNESSES:
F. E. Maynard
Charles Pickles

INVENTOR
Frank S. Holley
BY G. H. Strong
ATTORNEY

UNITED STATES PATENT OFFICE.

FRANK S. HOLLEY, OF STOCKTON, CALIFORNIA.

TRAVELING HARVESTER.

1,096,428.   Specification of Letters Patent.   Patented May 12, 1914.

Application filed October 23, 1912. Serial No. 727,354.

*To all whom it may concern:*

Be it known that I, FRANK S. HOLLEY, a citizen of the United States, residing at Stockton, in the county of San Joaquin and State of California, have invented new and useful Improvements in Traveling Harvesters, of which the following is a specification.

This invention relates to traveling harvesters.

The object of the present invention is to provide in a harvester having the usual separating or threshing mechanism and a header, means whereby said mechanism and the header can be driven when the vehicle is horse propelled, or which may be driven by a motor, such as a gas engine, mounted on the apparatus; the driving mechanism including such elements that either the motor may be selected to drive the threshing mechanism and header, or power to drive the same may be derived from the main traction wheel or wheels.

In practice it is frequently advantageous to be able to select either the motor or the traction wheel under certain conditions to operate the cutting, feeding and threshing mechanisms. Thus in order to still drive the threshing mechanism in the event of the stopping of the machine is down or heavy lodged grain, it is necessary to have the motor. At other times when the machine is working in thin grain and the draft on the animals is comparatively light, it may be more economical or advisable to run the machinery from the main supporting wheel or bull-wheel of the machine.

The invention consists in combination with a traveling harvester, of alternative means for driving the threshing mechanism and the header of the harvester from an independent motor on the harvester frame, or from the traction wheel of the machine, with mechanism for selectively connecting the traction wheel to the driving mechanism or connecting the motor thereto.

It also comprises details of construction which will be more fully explained by reference to the accompanying drawings, in which—

Figure 1:
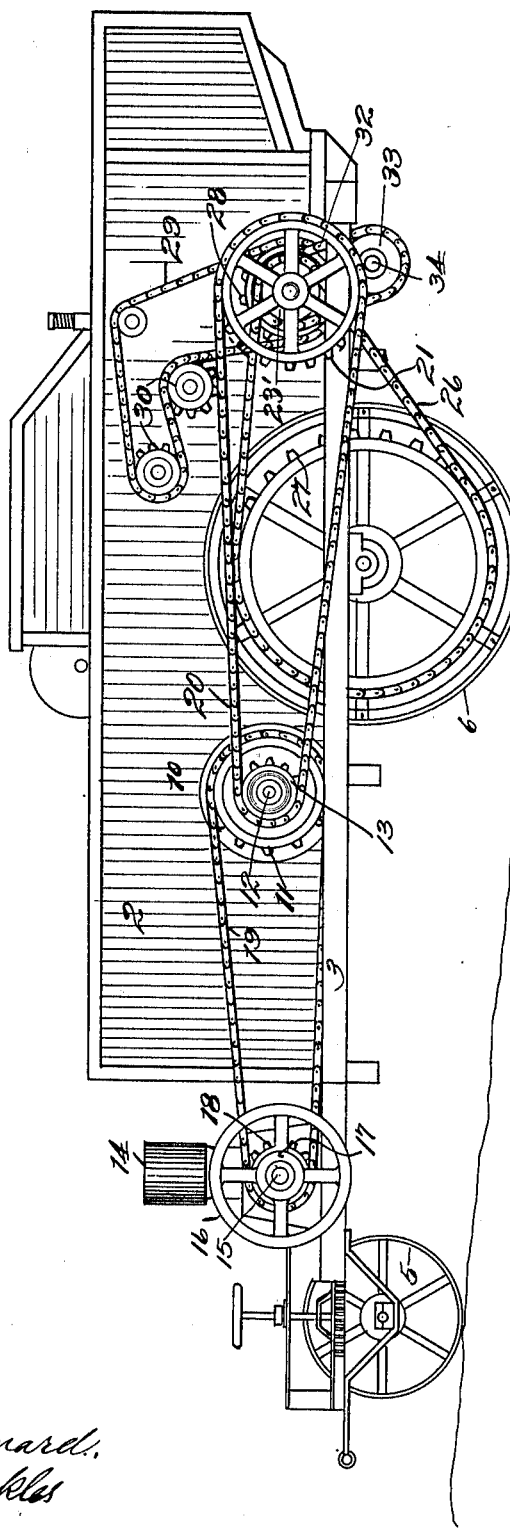
Figure 2:
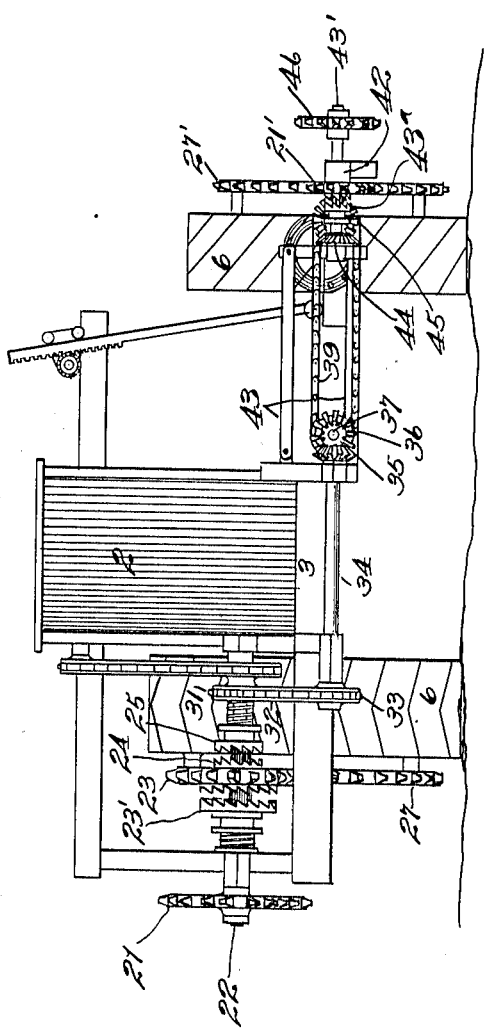
Figure 3:
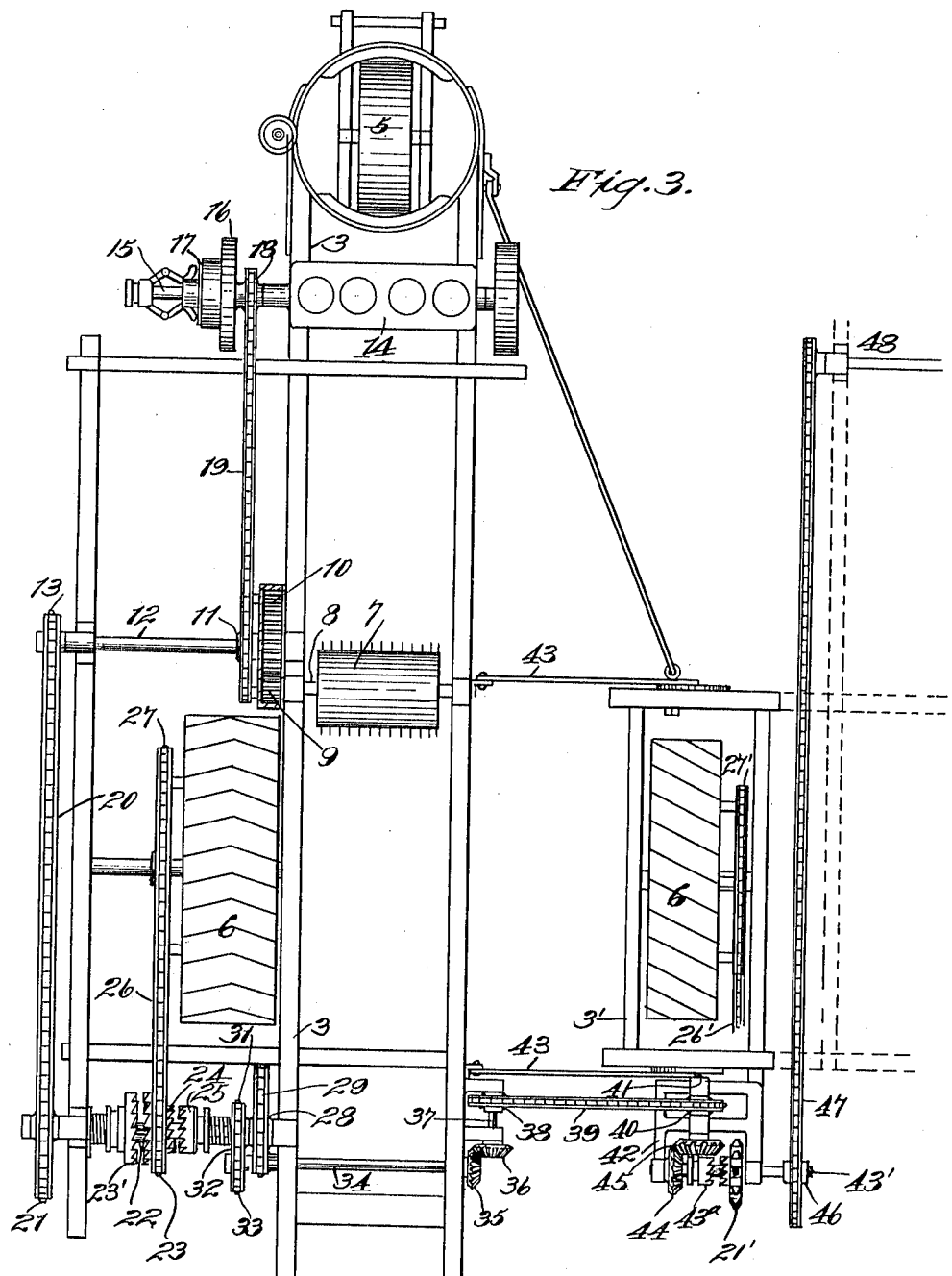

Figure 1 is a side elevation of the improved harvester. Fig. 2 is a rear end view partly in section. Fig. 3 is a diagrammatic, plan view of the transmission.

In its illustrated embodiment 2 represents the housing for the threshing and cleaning mechanisms of the harvester, which is mounted upon suitable sills or frame 3. At the forward end of the frame 3 is a steering wheel 5, to which may be attached suitable traction means, as a team of horses or traction engine.

6 is a suitable traction wheel or wheels carrying the main part of the load.

The threshing cylinder 7 is mounted upon a shaft 8 appropriately journaled in the housing. One end of the shaft projects through the housing and carries a pinion 9, meshing with and driven by an internal gear 10, attached to or forming a part of a sprocket wheel 11 secured on the countershaft or jack-shaft 12. Also secured on the countershaft 12, at its outer end, is a sprocket 13.

My invention relates particularly to means whereby the threshing and separating mechanism, including the cylinder 7, may be driven either from the main traction wheel 6, or by a suitable motor 14 mounted on the harvester frame. As shown, motor 14 has a shaft 15 carrying a fly-wheel 16 which may be loose upon the shaft 15 and coupled thereto, when desired, by a suitable clutch 17. Secured to or formed with the fly-wheel 16 is a sprocket pinion 18, driving a sprocket chain 19 which runs to and drives the sprocket wheel which is fastened upon the countershaft 12. From this it will be seen that when the motor 14 is running, if it is desired to operate the threshing mechanism thereby, the clutch 17 is manipulated to connect the fly-wheel 16 to the engine shaft, so that the power of the engine will be transmitted by the sprocket chain 19, or other equivalent mechanism, to and drive the countershaft 12. This in turn, through the internal gear 10, drives the pinion 9 and the cylinder shaft 8.

From the countershaft 12 power is transmitted by the pinion 13 by means of a sprocket chain 20, running from the pinion 13 to and driving a master sprocket 21 which is secured on the outer end of an intermediate main shaft 22 projecting from one side of the housing 2 and supported on the frame 3. Also mounted on the intermediate main shaft 22 is a sprocket pinion 23; this being normally loose on the shaft and having a clutch face 24 which may be coupled to a slidable clutch jaw 25 keyed on the shaft 22 when it is desired to cause the sprocket pinion 23 to be positively connected to the shaft 22. The purpose of the sprocket pinion 23 is to derive power through a sprocket chain connection 26 from a driver or sprocket ring 27, which is secured to or formed upon one of the traction wheels 6.

It will be seen that if the vehicle be horse-propelled and conditions are such that the machine can move along steadily and continually at uniform speed so as to run the cylinder and cutting mechanism at proper speed, and the draft is not too great on the team, I disconnect the motor 14 and connect the threshing cylinder with the traction wheel 6 by clutch 25. The motor 14 may be disconnected by releasing the clutch 17; whereupon by throwing in the clutch jaw 25 to positively engage the sprocket wheel clutch 24, power will be derived from the traction wheel through means of its connected sprocket driver 27. This power delivered to and rotating the shaft 22 will be imparted, by reason of the sprocket wheels and chain 21, 13 and 20, respectively, so that the countershaft 12 will be driven from the wheel 6 as will the remaining part of the threshing and cutting mechanisms, which are not necessary here to describe or shown in detail.

The driving means for the separator comprises the sprocket shaft 22, a sprocket wheel 28 keyed thereon, and a chain 29 running on the sprocket wheel 28 and traveling over and driving other sprocket wheels 30 which transmit their motion to the separating mechanism within the housing 2. Power is transmitted from the sprocket shaft 22 to drive the header or cutting mechanism by the following means: Secured upon the sprocket shaft 22 is a sprocket wheel 31, driving a sprocket chain 32 engaging a sprocket pinion 33 secured on a cross-shaft 34. The cross-shaft 34 extends transversely across the rear end of the housing 2 and carries on its opposite end a pinion gear 35, meshing with and driving a corresponding gear 36 which is fast on a short shaft 37; the shaft 37 extending parallel to the harvester frame, as shown in Fig. 3. The longitudinal shaft 37 carries a sprocket pinion 38 which drives a transversely extending sprocket chain 39 which extends outwardly and drives a sprocket pinion 40, secured on a pinion shaft 41; this shaft being appropriately mounted in a bearing or bracket frame 42 attached to the contiguous portion of a wheel and header frame 3', which is shown as hinged by a parallel link structure 43 to the main frame of the harvester, by which the threshing mechanism may be maintained always horizontal, even when the machine is working on a side hill. Preferably the short, longitudinal shaft 37 is arranged in close proximity to the pivots of the link structure 43, adjacent to the side of the main housing 2, so that the sprocket chain 39 will automatically compensate and accommodate itself to the angular position or adjustment of the wheel frame 3' to the main body 2 during operation on a hillside. The shaft 43' carries a pinion 44 meshing with a corresponding pinion 45 fast on the shaft 41 and also carries a driving sprocket 46, driving a chain 47 which runs forwardly and drives the header mechanism indicated generally at 48. There is provided, and may be used to derive power, the wheel 6 on the grain side of the machine and the driver sprocket 27' over which may be run a chain 26' to drive a sprocket 21' on the header countershaft; the chain 26' being removed during the operation of the vehicle by the engine 14. By throwing out engine clutch and throwing in clutch on the main wheel countershaft, the machine is converted into what is termed a "horse propelled harvester." Many times it has been found advantageous to shift from one to the other in case of accident. If the gas engine fails to furnish power for driving the separator, the clutch 25 on the main separator shaft is allowed to engage with the sprocket 23, causing a continuous drive of all parts of the separator, independent of the gas engine; the main driving wheel taking traction from the ground in the usual manner of such machines. In order that the engine may be positively connected to and drive the traction wheel 6, shaft 22 is provided with a splined clutch jaw 23' which is shiftable into engagement with the complementary side of the sprocket wheel 23 when the vehicle is to be motor-propelled. To equalize the traction drive on both traction wheels 6, a clutch 43ª is splined on shaft 43' and is engageable with the sprocket wheel 21' to drive wheel 6 with driver sprocket 27'.

Having thus described my invention, what I claim and desire to secure by Letters Patent is—

1. In a traveling threshing machine provided with a motor, a countershaft to the rear of said motor, a main shaft at the rear of said threshing machine, a main bearing wheel shaft located substantially intermediate said counter shaft and main shaft, a main bearing wheel on said bearing wheel shaft, a threshing cylinder having driving connection with said counter shaft, and a separator having clutch connection with the motor and with the bearing wheel so as to derive power from either alone or concomitantly from both.

2. A frame for a traveling threshing machine having a motor mounted on the forward end thereof, a counter shaft, a bearing wheel shaft and a main shaft journaled in said frame in the order named, a threshing cylinder having driving connection with the counter shaft, a clutch loosely mounted on the main shaft, sprocket connections between said clutch and said bearing wheel shaft, stationary clutch members carried by the main shaft on opposite sides of said loose clutch member, a separator having sprocket connections with one of said stationary clutch members, sprocket connections between the motor and the other of said stationary clutch members, said connections being such that the motor power is available for driving said threshing cylinder and said separator, that the power developed by said bearing wheel shaft is available for driving said mechanisms, or that both sources are available for simultaneously driving said mechanisms.

In testimony whereof I have hereunto set my hand in the presence of two subscribing witnesses.

FRANK S. HOLLEY.

Witnesses:
W. W. HEALEY,
G. M. PAGE.

Copies of this patent may be obtained for five cents each, by addressing the "Commissioner of Patents, Washington. D. C."